(12) United States Patent
Martinez-Guzman et al.

(10) Patent No.: US 8,802,615 B2
(45) Date of Patent: Aug. 12, 2014

(54) METHOD FOR MAKING A PARTICLE COMPRISING MICRONISED SULPHATE

(71) Applicant: The Procter & Gamble Company, Cincinnati, OH (US)

(72) Inventors: Andres Arturo Martinez-Guzman, Newcastle upon Tyne (GB); Adam Porter, Whitley Bay (GB); Hossam Hassan Tantawy, Morpeth (GB); Nigel Patrick Somerville-Roberts, Newcastle upon Tyne (GB); Alan Thomas Brooker, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/771,525

(22) Filed: Feb. 20, 2013

(65) Prior Publication Data

US 2013/0324453 A1    Dec. 5, 2013

(30) Foreign Application Priority Data

Jun. 1, 2012   (EP) ..................................... 12170468

(51) Int. Cl.
*C11D 11/02*    (2006.01)

(52) U.S. Cl.
USPC ........... 510/443; 510/276; 510/361; 510/369; 510/398; 510/418; 510/434; 510/444; 510/477; 510/478; 510/452

(58) Field of Classification Search
USPC ......... 510/276, 361, 369, 398, 418, 434, 443, 510/444, 452, 478
See application file for complete search history.

(56) References Cited

U.S. PATENT DOCUMENTS

| | | | |
|---|---|---|---|
| 3,816,352 A | 6/1974 | Loureiro et al. | |
| 4,006,110 A | 2/1977 | Kenney et al. | |
| 5,998,356 A | 12/1999 | Dorset et al. | |
| 6,211,138 B1 * | 4/2001 | Beimesch | 510/444 |
| 7,446,085 B2 | 11/2008 | Imaizumi et al. | |
| 7,485,614 B2 | 2/2009 | Boucher et al. | |
| 7,811,980 B1 | 10/2010 | Tantawy et al. | |
| 2003/0203832 A1 | 10/2003 | Boucher et al. | |
| 2005/0187131 A1 * | 8/2005 | Brooker et al. | 510/446 |
| 2006/0069007 A1 | 3/2006 | Boucher et al. | |
| 2009/0325844 A1 | 12/2009 | Tantawy et al. | |
| 2011/0147966 A1 | 6/2011 | Tantawy et al. | |
| 2011/0147967 A1 | 6/2011 | Cardozo et al. | |
| 2012/0245073 A1 * | 9/2012 | Tantawy et al. | 510/357 |
| 2013/0320575 A1 | 12/2013 | Tantawy et al. | |

OTHER PUBLICATIONS

PCT Search Report, PCT/US2013/043269, dated Jul. 18, 2013, containing 11 pages.

* cited by examiner

*Primary Examiner* — Charles Boyer
(74) *Attorney, Agent, or Firm* — Gregory S. Darley-Emerson; Steven W. Miller

(57) ABSTRACT

A process for making a particle comprising at least 45 wt % sulphate, from 0 wt % to 15 wt % anionic detersive surfactant, and having a bulk density of from 350 g/l to 700 g/l, comprising the steps of; (a) preparing an aqueous slurry comprising sulphate, and optionally detersive surfactant; (b) drying the particle; and wherein the sulphate added to the aqueous slurry has a volume average particle size of from 10 micrometers to 50 micrometers.

18 Claims, 1 Drawing Sheet

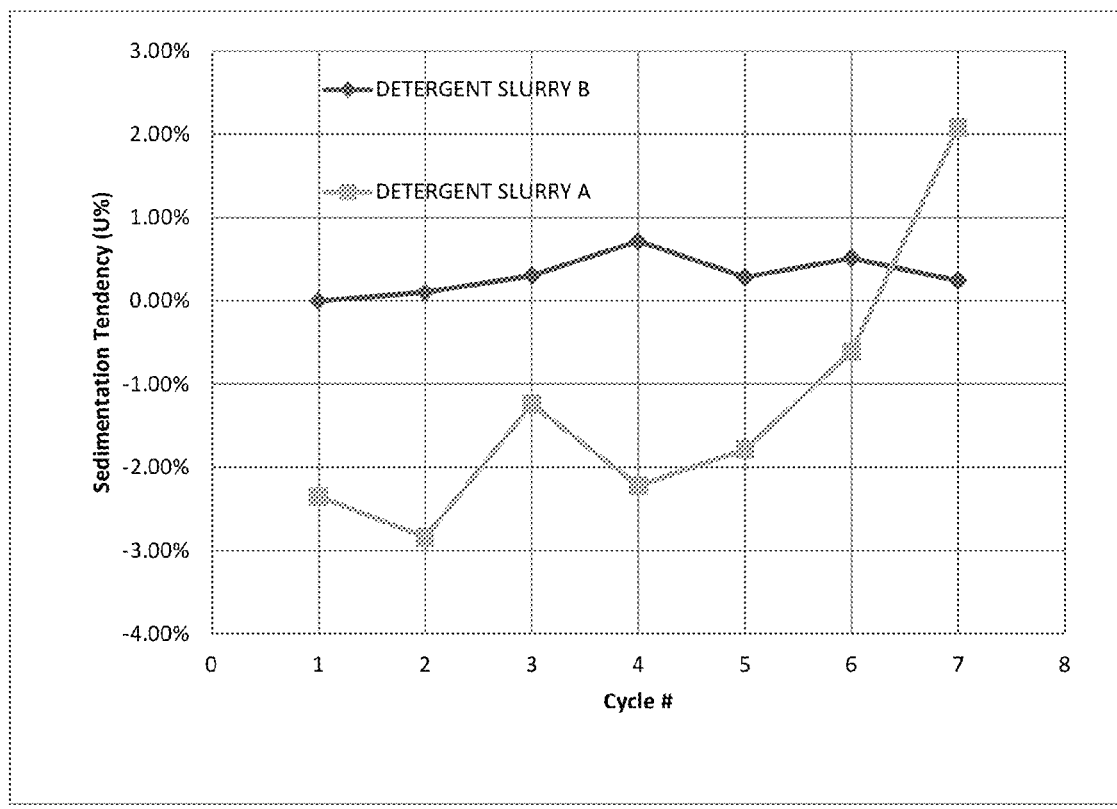

METHOD FOR MAKING A PARTICLE COMPRISING MICRONISED SULPHATE

FIELD OF THE INVENTION

The present invention relates to a process for making a particle.

BACKGROUND OF THE INVENTION

Particulate detergent compositions comprise detersive active ingredients. Oftentimes these detersive ingredients make the particles 'sticky'. This has the effect of making the particles stick together which negatively impacts the flowability of the granular composition and can affect the dissolution in the wash liquor. Therefore, a 'bulking agent' in the form of a separate particle or powder is often added to the granular composition to counteract the stickiness and maintain good flowability.

Sulphate is often used as a bulking agent. However, upon addition to the wash liquor, sulphate rapidly sinks and forms a sediment at the bottom of the container as it has a very high bulk density. Consumers associate this sedimentation with 'poor cleaning' as they believe that the composition is not dissolving into the water and so 'not working'. Furthermore, in a fabric hand washing context, the slowly dissolving sediment makes the wash liquor feel 'gritty'. Consumers associate this with 'dirty wash water' and 'lack of cleaning'. In addition, as the slowly dissolving sulphate sediments in the wash liquor, it can trap other detergent components and so affect the overall cleaning performance.

A further problem is that the overall bulk density of the detergent composition is higher. This means that consumers tend to over- or under-dose the amount of detergent composition to add to the wash liquor.

One way to overcome this is to produce a particle comprising sulphate but wherein the particle has a lower bulk density than that of traditional sulphate particles. To achieve this lower bulk density, the particle needs to be manufactured using processes such as spray-drying or flash-drying. Spray- and flash-drying require the preparation of an aqueous slurry which is then dried to make the spray- or flash-dried particle. Sulphate added to this slurry tends to sediment out and so can cause blockages and associated issues during manufacture.

Thus, there is a need in the art for a process that at least in part overcomes the above mentioned problems.

The Inventors surprisingly found that a process for making a particle comprising at least 45 wt % sulphate, from 0 wt % to 15 wt % anionic detersive surfactant, and having a bulk density of from 350 g/l to 700 g/l, comprising the steps of; (a) preparing an aqueous slurry comprising sulphate, and optionally detersive surfactant; (b) drying the particle; and wherein the sulphate added to the aqueous slurry has a volume average particle size of from 10 micrometers to 50 micrometers overcame the above-mentioned sedimentation problem. It was also surprisingly found that when particles made using the process of the present invention were added to a wash liquor, the resultant wash liquor had a less 'gritty' feel.

SUMMARY OF THE INVENTION

The present invention is to a process for making a particle comprising at least 45 wt % sulphate, from 0 wt % to 15 wt % anionic detersive surfactant, and having a bulk density of from 350 g/l to 700 g/l, comprising the steps of;

a) preparing an aqueous slurry comprising sulphate, and optionally detersive surfactant;
b) drying the particle;
and wherein the sulphate added to the aqueous slurry has a volume average particle size of from 10 micrometers to 50 micrometers.

The present invention is also to a particle comprising at least 45 wt % sulphate, from 0 wt % to 10 wt % silicate, from 0 wt % to 10 wt % polymer and from 0 wt % to 15 wt % anionic detersive surfactant, having a bulk density of from 350 g/l to 700 g/l wherein the particle is a spray-dried or flash-dried particle.

BRIEF DESCRIPTION OF THE DRAWINGS

FIG. 1. Sedimentation Tendency (U %) across cycles for Slurry A and Slurry B

DETAILED DESCRIPTION OF THE INVENTION

Process to Make a Particle

The present invention is to a process for making a particle comprising at least 45 wt % sulphate, from 0 wt % to 15 wt % anionic detersive surfactant, and having a bulk density of from 350 g/l to 700 g/l, comprising the steps of;

a) preparing an aqueous slurry comprising sulphate, and optionally detersive surfactant;
b) drying the particle;
and wherein the sulphate added to the aqueous slurry has a volume average particle size of from 10 micrometers to 50 micrometers.

The particle may comprise at least 55 wt %, or even 65 wt % or even 75 wt % sulphate. The particle may comprise at most 99 wt % sulphate, or even 90 wt %, or even 85 wt % or even 80 wt % sulphate.

Step (a): the aqueous slurry can be formed by mixing in any suitable vessel, such as a mixer, in the standard manner. Suitable mixers include vertical mixers, slurry mixers, tank agitators, crutcher mixers and the like. Suitable sulphate, silicate, polymer and detersive surfactant are described below. The slurry preferably comprises form 30 to 60 wt % water. The slurry may comprise, silicate, polymer or a mixture thereof.

Step (b): the aqueous slurry is transferred from the mixer, preferably through at least one pump, to preferably a spray nozzle. Typically, the aqueous slurry is transferred in a pipe. The aqueous slurry is typically transferred though an intermediate storage vessel such as a drop tank, for example when the process is semi-continuous. Alternatively, the process can be a continuous process, in which case no intermediate storage vessel is required. The aqueous slurry is transferred through at least one pump, preferably at least two, or even at least three or more pumps, although one or two, preferably two pumps may be preferred. Typically, when two or more pumps are used, the first pump is a low pressure pump, such as a pump that is capable of generating a pressure of from $3 \times 10^5$ to $1 \times 10^6$ Pa, and the second pump is a high pressure pump, such as a pump that is capable of generating a pressure of from $2 \times 10^6$ to $1 \times 10^7$ Pa. Optionally, the aqueous slurry is transferred through a disintegrator, such as disintegrators supplied by Hosakawa Micron. The disintegrator can be positioned before the pump, or after the pump. If two or more pumps are present, then the disintegrator can also be positioned between the pumps. Typically, the pumps, disintegrators, intermediate storage vessels, if present, are all in series configuration. However, some equipment may be in a parallel configuration. A suitable spray nozzle is a Spray Systems T4 Nozzle.

A gas, preferably air, can be injected into the aqueous slurry prior to spray-drying or flash-drying. The gas may be injected into the aqueous slurry between the first pump and the second pump. Without wishing to be bound by theory, by injecting air into the slurry introduces air bubbles into the slurry. When the slurry is spray-dried or flash-dried the air bubbles are incorporated into the resultant powder. This decreases the overall bulk density of the particle.

In step (b), it may be preferred that additionally sodium chloride is contacted to the aqueous slurry after the mixer and before the spray nozzle.

The aqueous slurry is sprayed through the spray nozzle into a spray-drying tower or a flash-drying tower. Preferably, the aqueous slurry is kept at a temperature of 30° C. or above, or even 32° C. and above. At these temperatures the sulphate remains dissolved in the slurry. Below these temperatures it comes out of the aqueous slurry. Preferably, the aqueous slurry is at a temperature of from 60° C. to 130° C. when it is sprayed through the spray nozzle into the spray-drying tower. Suitable spray-drying towers are co-current or counter-current spray-drying towers. The slurry is typically sprayed at a pressure of from $6 \times 10^6$ Pa to $1 \times 10^7$ Pa.

When added to the aqueous slurry, the sulphate has a volume average particle size of from 10 micrometers to 50 micrometers, preferably from 20 micrometers, or from 30 micrometers, and preferably to 45 micrometers, or even to 42 micrometers. The volume average particle size of the sulphate can be determined by any conventional means, such as light scattering, for example using a sympatec particle size analyser. The particle size of the inorganic salt can be controlled (i.e. reduced) by any suitable means, such as dry grinding (e.g. using pin mills) or wet grinding (e.g. using colloid mill). Without wishing to be bound by theory, smaller particle size sulphate dissolves more efficiently into the aqueous slurry. It is believed this is due to the larger surface area of the sulphate particles. This improved efficiency of dissolution has the benefit that less sulphate sediments out of the slurry during the manufacturing process. Sedimentation can cause blockages in the apparatus and so negatively affect production. Furthermore, the smaller particle size of the sulphate in the resultant spray-dried particle has the benefit of further reducing the 'gritty' feel within the wash liquor.

The slurry is dried, preferably via spray-drying to form a spray-dried powder. Preferably, the exhaust air temperature is in the range of from 60° C. to 100° C.

The Particle

The present invention is also to a particle comprising at least 45 wt % sulphate, from 0 wt % to 10 wt % silicate, from 0 wt % to 10 wt % polymer and from 0 wt % to 15 wt % anionic detersive surfactant, having a bulk density of from 350 g/l to 700 g/l wherein the particle is a spray-dried or flash-dried particle. Preferably the particle is made according to the process of the present invention.

The sulphate is described in more detail below. The particle may comprise at least 55 wt %, or even 65 wt % or even 75 wt % sulphate. The particle may comprise at most 99 wt % sulphate, or even 90 wt %, or even 85 wt % or even 80 wt % sulphate.

The particle may comprise carbonate. If carbonate is present in the particle, it may be present at a concentration of between 0 wt % and 30 wt %, or at most 20 wt %, or even at most 10 wt %. Carbonate may be present in the particle at a concentration of at least 1 wt %, or even 2 wt %, or even 5 wt % or even 10 wt %, or even 15 wt %.

The particle may comprise from 0 to 10 wt % polymer. Suitable polymers are described in more detail below. The polymer in the particle can be selected from a polycarboxylate homopolymer or a polycarboxylate copolymer, preferably the polymer is selected from polyacrylate homopolymer or acrylic acid/maleic acid copolymer.

Suitable anionic detersive surfactants are described in more detail below. The anionic detersive surfactant in the particle can be linear alkylbenzene sulfonate. Or the anionic detersive surfactant in the particle can be alkyl ethoxylated sulphate The particle may comprise from 0 to 10 wt % silicate.

The particle may have a mean particle size of between 350 and 500 μm, preferably 375-425 μm.

Without wishing to be bound by theory, the density of the particle means that it floats in the wash liquor and exhibits reduced sedimentation. The density of the particle is lower than traditionally used sulphate particles. This is preferably achieved by spray-drying or flash-drying the particle. During the spray-drying or flash-drying process, preferably air is injected into the aqueous slurry which is then spray-dried or flash-dried to produce the particle. This results in 'air bubbles' in the particle. This increased porosity means that the particle has a higher surface area, and so the particle dissolves faster in the wash liquor. This faster dissolution and lower level of sedimentation means that the wash liquor does not have the same gritty feel as if traditional sulphate particles were used. However, the particle still acts as a bulking agent ensuring excellent flowbability of the powder composition.

The particle may be a spray-dried particle, a flash-dried particle, an agglomerate particle, or an extrudate. Preferably, the particle is a spray-dried particle.

The bulk density of the particle can be from 350 g/l to 600 g/l, or from 400 g/l to 550 g/l.

Sulphate

The sulphate in the particle can be any suitable sulphate.

Polymer

The polymer can be any suitable polymer.

Suitable polymers include carboxylate polymers, such as polyacrylates, and acrylate/maleate co-polymers and other functionalized polymers such as styrene acrylates. Preferably, the carboxylate polymer is an acrylate/maleate copolymer having an average molecular weight of about 2,000 to about 100,000 and a ratio of acrylate to maleate segments of from about 30:1 to about 1:1.

One suitable polymer is an amphiphilic graft polymer (AGP). Suitable AGPs are obtainable by grafting a polyalkylene oxide of number average molecular weight from about 2,000 to about 100,000 with vinyl acetate, which may be partially saponified, in a weight ratio of polyalkylene oxide to vinyl acetate of about 1:0.2 to about 1:10. The vinyl acetate may, for example, be saponified to an extent of up to 15%. The polyalkylene oxide may contain units of ethylene oxide, propylene oxide and/or butylene oxide. Selected embodiments comprise ethylene oxide.

In some embodiments the polyalkylene oxide has a number average molecular weight of from about 4,000 to about 50,000, and the weight ratio of polyalkylene oxide to vinyl acetate is from about 1:0.5 to about 1:6. A material within this definition, based on polyethylene oxide of molecular weight 6,000 (equivalent to 136 ethylene oxide units), containing approximately 3 parts by weight of vinyl acetate units per 1 part by weight of polyethylene oxide, and having itself a molecular weight of about 24,000, is commercially available from BASF as Sokalan HP22.

Suitable AGPs may be present in the detergent composition at weight percentages of from about 0 to about 5%, preferably from about above 0% to about 4%, or from about 0.5% to about 2%. In some embodiments, the AGP is present at greater than about 1.5 wt %. The AGPs are found to provide excellent hydrophobic soil suspension even in the presence of cationic coacervating polymers.

Preferred AGPs are based on water-soluble polyalkylene oxides as a graft base and side chains formed by polymerization of a vinyl ester component. These polymers having an average of less than or equal to one graft site per 50 alkylene oxide units and mean molar masses (Mw) of from about 3000 to about 100,000.

Another suitable polymer is polyethylene oxide, preferably substituted or un-substituted.

Another suitable polymer is cellulosic polymer, preferably selected from alkyl cellulose, alkyl alkoxyalkyl cellulose, carboxylalkyl cellulose, alkyl carboxyalkyl, more preferably selected from carboxymethyl cellulose (CMC) including blocky CMC, methyl cellulose, methyl hydroxyethyl cellulose, methyl carboxymethyl cellulose, and mixtures thereof.

Other suitable polymers are soil release polymers. Suitable polymers include polyester soil release polymers. Other suitable polymers include terephthalate polymers, polyurethanes, and mixtures thereof. The soil release polymers, such as terephthalate and polyurethane polymers can be hydrophobically modified, for example to give additional benefits such as sudsing.

Other suitable polymers include polyamines, preferably polyethylene imine polymers, preferably having ethylene oxide and/or propylene oxide functionalized blocks Other suitable polymers include synthetic amino containing amphoteric/and/or zwitterionic polymers, such as those derived from hexamethylene diamine Another suitable polymer is a polymer that can be co-micellized by surfactants, such as the AGP described in more detail above.

Other suitable polymers include silicone, including amino-functionalised silicone.

Suitable polymers can include clay and soil removal/anti-redeposition agents being co-polymers comprising:
(i) from 50 to less than 98 wt % structural units derived from one or more monomers comprising carboxyl groups; (ii) from 1 to less than 49 wt % structural units derived from one or more monomers comprising sulfonate moieties; and (iii) from 1 to 49 wt % structural units derived from one or more types of monomers selected from ether bond-containing monomers represented by formulas (I) and (II):

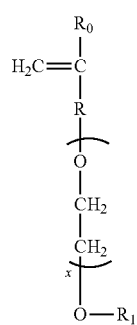

formula (I)

wherein in formula (I), $R_0$ represents a hydrogen atom or $CH_3$ group, R represents a $CH_2$ group, $CH_2CH_2$ group or single bond, X represents a number 0-5 provided X represents a number 1-5 when R is a single bond, and $R_1$ is a hydrogen atom or $C_1$ to $C_{20}$ organic group;

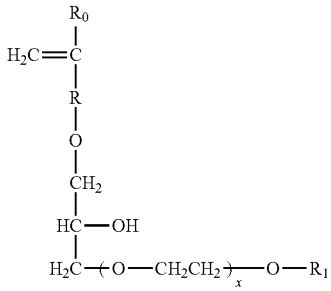

formula (II)

in formula (II), $R_0$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group.

Other suitable polymers include polysaccharide polymers such as celluloses, starches, lignins, hemicellulose, and mixtures thereof.

Other suitable polymers include cationic polymers, such as deposition aid polymers, such as cationically modified cellulose such as cationic hydroxy ethylene cellulose, cationic guar gum, cationic starch, cationic acrylamides and mixtures thereof.

Mixtures of any of the above described polymers can be used herein.

Anionic Detersive Surfactant

The anionic detersive surfactant can be alkyl benzene sulphonic acid or salt thereof, alkyl ethoxylated sulphate, or a mixture thereof. Preferably, the anionic detersive surfactant is a mixture of alkyl benzene sulphonic acid or salt thereof and alkyl ethoxylated sulphate.

Suitable anionic detersive surfactants include sulphate and sulphonate detersive surfactants.

Preferred sulphonate detersive surfactants include alkyl benzene sulphonate, preferably $C_{10-13}$ alkyl benzene sulphonate. Suitable alkyl benzene sulphonate (LAS) is obtainable, preferably obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable.

Preferred sulphate detersive surfactants include alkyl sulphate, preferably $C_{8-18}$ alkyl sulphate, or predominantly $C_{12}$ alkyl sulphate.

Another preferred sulphate detersive surfactant is alkyl alkoxylated sulphate, preferably alkyl ethoxylated sulphate, preferably a $C_{8-18}$ alkyl alkoxylated sulphate, preferably a $C_{8-18}$ alkyl ethoxylated sulphate, preferably the alkyl alkoxylated sulphate has an average degree of alkoxylation of from 0.5 to 20, preferably from 0.5 to 10, preferably the alkyl alkoxylated sulphate is a $C_{8-18}$ alkyl ethoxylated sulphate having an average degree of ethoxylation of from 0.5 to 10, preferably from 0.5 to 7, more preferably from 0.5 to 5 and most preferably from 0.5 to 3.

The alkyl sulphate, alkyl alkoxylated sulphate and alkyl benzene sulphonates may be linear or branched, substituted or un-substituted.

Silicate Salt

A suitable silicate salt is sodium silicate, preferably 1.6R and/or 2.0R sodium silicate.

The Laundry Detergent Powder

The present invention contemplates a laundry detergent powder comprising the particle of the present invention. The laundry detergent powder of the present invention preferably comprises from 20 to 80 wt % of the particle or even from 50 wt % to 80 wt %, or even from 60 wt % to 80 wt % by weight of the laundry detergent powder.

The laundry detergent powder is suitable for any laundry detergent application, for example: laundry, including automatic washing machine laundering and hand laundering, and even bleach and laundry additives.

The laundry detergent powder can be a fully formulated detergent product, such as a fully formulated laundry detergent product, or it can be combined with other particles to form a fully formulated detergent product, such as a fully formulated laundry detergent product. The particle may be combined with other particles such as: enzyme particles; perfume particles including agglomerates or extrudates of perfume microcapsules, and perfume encapsulates such as starch encapsulated perfume accord particles; surfactant particles, such as non-ionic detersive surfactant particles including agglomerates or extrudates, anionic detersive surfactant particles including agglomerates and extrudates, and cationic detersive surfactant particles including agglomerates and extrudates; polymer particles including soil release polymer particles, cellulosic polymer particles; buffer particles including carbonate salt and/or silicate salt particles, preferably a particle comprising carbonate salt and silicate salt such as a sodium carbonate and sodium silicate co-particle, and particles and sodium bicarbonate; other spray-dried particles; fluorescent whitening particles; aesthetic particles such as coloured noodles or needles or lamellae particles; bleaching particles such as percarbonate particles, especially coated percarbonate particles, including carbonate and/or sulphate coated percarbonate, silicate coated percarbonate, borosilicate coated percarbonate, sodium perborate coated percarbonate; bleach catalyst particles, such as transition metal catalyst bleach particles, and imine bleach boosting particles; performed peracid particles; hueing dye particles; and any mixture thereof. In a preferred embodiment the laundry detergent composition also comprises a particle comprising less than 50 wt % sulphate, at least 20 wt % anionic detersive surfactant, from 1 wt % to 5 wt % polymer, from 15 to 40 wt % carbonate and having a bulk density of from 300 g/l to 900 g/l.

It may also be especially preferred for the laundry detergent powder to comprise low levels, or even be essentially free, of builder. By essentially free of it is typically meant herein to mean: "comprises no deliberately added". In a preferred embodiment, the laundry detergent powder comprises no builder.

The laundry detergent powder is typically flowable, typically having a cake strength of from 0 N to 20 N, preferably from 0 N to 15 N, more preferably from 0 N to 10 N, most preferably from 0 N to 5 N. The method to determine the cake strength is described in more detail elsewhere in the description.

The laundry detergent powder typically comprises from 0 wt % to 7 wt %, preferably from 1 wt % to 5 wt %, and preferably from 2 wt % to 3 wt % water.

Zeolite Builder

Suitable zeolite builder includes include zeolite A, zeolite P and zeolite MAP. Especially suitable is zeolite 4A.

Phosphate Builder

A typical phosphate builder is sodium tri-polyphosphate.

Silicate Salt

A suitable silicate salt is sodium silicate, preferably 1.6R and/or 2.0R sodium silicate.

Other Detergent Ingredients

The composition typically comprises other detergent ingredients. Suitable detergent ingredients include: transition metal catalysts; imine bleach boosters; enzymes such as amylases, carbohydrases, cellulases, laccases, lipases, bleaching enzymes such as oxidases and peroxidases, proteases, pectate lyases and mannanases; source of peroxygen such as percarbonate salts and/or perborate salts, preferred is sodium percarbonate, the source of peroxygen is preferably at least partially coated, preferably completely coated, by a coating ingredient such as a carbonate salt, a sulphate salt, a silicate salt, borosilicate, or mixtures, including mixed salts, thereof; bleach activator such as tetraacetyl ethylene diamine, oxybenzene sulphonate bleach activators such as nonanoyl oxybenzene sulphonate, caprolactam bleach activators, imide bleach activators such as N-nonanoyl-N-methyl acetamide, preformed peracids such as N,N-pthaloylamino peroxycaproic acid, nonylamido peroxyadipic acid or dibenzoyl peroxide; suds suppressing systems such as silicone based suds suppressors; brighteners; hueing agents; photobleach; fabric-softening agents such as clay, silicone and/or quaternary ammonium compounds; flocculants such as polyethylene oxide; dye transfer inhibitors such as polyvinylpyrrolidone, poly 4-vinylpyridine N-oxide and/or co-polymer of vinylpyrrolidone and vinylimidazole; fabric integrity components such as oligomers produced by the condensation of imidazole and epichlorhydrin; soil dispersants and soil anti-redeposition aids such as alkoxylated polyamines and ethoxylated ethyleneimine polymers; anti-redeposition components such as polyesters and/or terephthalate polymers, polyethylene glycol including polyethylene glycol substituted with vinyl alcohol and/or vinyl acetate pendant groups; perfumes such as perfume microcapsules, polymer assisted perfume delivery systems including Schiff base perfume/polymer complexes, starch encapsulated perfume accords; soap rings; aesthetic particles including coloured noodles and/or needles; dyes; fillers such as sodium sulphate, although it may be preferred for the composition to be substantially free of fillers; carbonate salt including sodium carbonate and/or sodium bicarbonate; silicate salt such as sodium silicate, including 1.6R and 2.0R sodium silicate, or sodium metasilicate; co-polyesters of di-carboxylic acids and diols; cellulosic polymers such as methyl cellulose, carboxymethyl cellulose, hydroxyethoxycellulose, or other alkyl or alkylalkoxy cellulose, and hydrophobically modified cellulose; carboxylic acid and/or salts thereof, including citric acid and/or sodium citrate; and any combination thereof.

Method for Measuring Cake Strength

A smooth plastic cylinder of internal diameter 6.35 cm and length 15.9 cm is supported on a suitable base plate. A 0.65 cm hole is drilled through the cylinder with the centre of the hole being 9.2 cm from the end opposite the base plate.

A metal pin is inserted through the hole and a smooth plastic sleeve of internal diameter 6.35 cm and length 15.25 cm is placed around the inner cylinder such that the sleeve can move freely up and down the cylinder and comes to rest on the metal pin. The space inside the sleeve is then filled (without tapping or excessive vibration) with the spray-dried powder such that the spray-dried powder is level with the top of the sleeve. A lid is placed on top of the sleeve and a 5 kg weight placed on the lid. The pin is then pulled out and the spray-dried powder is allowed to compact for 2 minutes. After 2 minutes the weight is removed, the sleeve is lowered to expose the powder cake with the lid remaining on top of the powder.

A metal probe is then lowered at 54 cm/min such that it contacts the centre of the lid and breaks the cake. The maximum force required to break the cake is recorded and is the result of the test. A cake strength of 0 N refers to the situation where no cake is formed.

EXAMPLES

Sedimentation of sulphate out of aqueous detergent slurries was tested. A first slurry was prepared comprising sulphate outside of the scope of the present invention, and a second slurry prepared within the scope of the present invention.

DETERGENT SLURRY A comprised an aqueous alkaline mixture composed of sodium sulphate, water, linear alkyl benzene sulphonate, acrylate/maleate co-polymer and miscellaneous ingredients, prepared at 50° C. in a crutcher making vessel. Detergent slurry A was essentially free from zeolite builder and essentially free from phosphate builder. The sodium sulphate had a mean particle size of 150 μm. Detergent slurry A was mixed for 25 minutes to ensure homogeneity of the slurry suspension. The overall composition of detergent slurry A is shown in Table 1.

TABLE 1

| Component | % w/w |
|---|---|
| Sodium silicate salt | 1.2% |
| Linear alkyl benzene sulphonate | 3.5% |
| Acrylate/maleate copolymer | 7.1% |
| Sodium sulphate - mean particle size 150 um | 58.2% |
| Water | 30.0% |
| Total Parts | 100.0% |

DETERGENT SLURRY B comprised an aqueous alkaline mixture composed of sodium sulphate, water, linear alkyl benzene sulphonate, acrylate/maleate co-polymer and miscellaneous ingredients, prepared under the same processing conditions as those used to prepare detergent slurry A. The sodium sulphate in detergent slurry B had a mean particle size of 20 μm. The overall composition of detergent slurry B is shown in Table 2.

TABLE 2

| Component | % w/w |
|---|---|
| Sodium silicate salt | 2.8% |
| Linear alkyl benzene sulphonate | 7.1% |
| Acrylate/maleate copolymer | 2.2% |
| Sodium sulphate - mean particle size: 20 um | 62.8% |
| Water | 25.0% |
| Total Parts | 100.0% |

The sedimentation potential of solid material in the detergent slurries was measured using the following dimensionless analysis technique: the slurry was subjected to the following stirring cycle:cycle 1:200 rpm down to 70 rpm; cycle 2:200 rpm down to 60 rpm; cycle 3:200 rpm down to 50 rpm; cycle 4:200 rpm down to 40 rpm; cycle 5:200 rpm down to 30 rpm; cycle 6:200 rpm down to 20 rpm; cycle 7:200 rpm down to 10 rpm. The difference in torque across cycles was measured. The data on delta torque was converted to a dimensionless number U (%), which was then plotted versus cycle number.

The test relies on the principle that with reducing agitator speed (rpm) it becomes more difficult to suspend the sodium sulphate. As the sodium sulphate sediments, the agitator torque increases. A slurry with zero sedimentation shows the same value of U (%) across cycles (slope in FIG. 1 is zero). The bigger the difference across U %, the more sedimentation the slurry is experiencing.

$$U(\%) = \left[1 - \frac{\text{Torque}_t - \text{Torque}_0}{\text{Torque}_0}\right] \cdot 100$$

The Sedimentation Tendency (U %) across cycles for detergent slurry A and detergent slurry B is shown in Table 3, and plotted in FIG. 1.

TABLE 3

| | Sedimentation Tendency (U %) Cycle # | | | | | | |
|---|---|---|---|---|---|---|---|
| | 1<br>200-70 RPM | 2<br>200-60 RPM | 3<br>200-50 RPM | 4<br>200-40 RPM | 5<br>200-30 RPM | 6<br>200-20 RPM | 7<br>200-10 RPM |
| DETERGENT SLURRY A | −2.35% | −2.84% | −1.24% | −2.22% | −1.78% | −0.61% | 2.08% |
| DETERGENT SLURRY B | 0.00% | 0.10% | 0.30% | 0.71% | 0.29% | 0.51% | 0.24% |

As can be seen from Table 3, detergent slurry A experienced more sodium sulphate sedimentation than detergent slurry B.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making a particle comprising at least about 55 wt % sulphate, from about 0 wt % to about 15 wt % anionic detersive surfactant, and having a bulk density of from about 350 g/l to about 700 g/l, comprising the steps of;
   a) preparing an aqueous slurry comprising sulphate and optionally detersive surfactant;
   b) drying the particle;
   and wherein the sulphate added to the aqueous slurry has a volume average particle size of from about 20 micrometers to about 45 micrometers.

2. The process according to claim 1, wherein the sulphate is dry ground or wet ground to achieve a volume average particle size of from about 10 micrometers to about 50 micrometers.

3. The process according to claim 1, wherein the particle comprises at least about 65 wt % sulphate.

4. The process according to claim 1 wherein the sulphate has a volume average particle size of from about 30 micrometers to about 42 micrometers.

5. The process according to claim 1 wherein the particle is dried by spray-drying or flash-drying.

6. The process according to claim 5, wherein the slurry is at a temperature of above about 30° C. prior to being spray-dried or flash-dried.

7. The process according to claim 6, wherein the slurry is at a temperature of above about 32° C. prior to being spray-dried or flash-dried.

8. The process according to claim 1, wherein the slurry comprises between about 30 and about 60 wt % water.

9. The process according to claim 1 wherein nitrogen-rich gas is injected into the slurry prior to spray-drying or flash-drying.

10. The process according to claim 9 wherein the nitrogen-rich gas is air.

11. The process according to claim 1 wherein the slurry is passed through a first pump and a second pump prior to being spray-dried or flash-dried.

12. The process according to claim 11 wherein the first pump is a low pressure pump and the second pump is a high pressure pump.

13. The process according to claim 11, wherein nitrogen-rich gas is injected into the slurry after the second pump and prior to spray-drying or flash-drying.

14. A particle comprising at least about 55 wt % sulphate, from about 0 wt % to about 15 wt % anionic detersive surfactant, and having a bulk density of from about 350 g/l to about 700 g/l wherein the particle is spray-dried or flash-dried and the sulphate added to the aqueous slurry has a volume average particle size of from about 20 micrometers to about 45 micrometers.

15. The particle according to claim 14, wherein the particle comprises preferably at least about 65 wt % sulphate.

16. The particle according to claim 14 comprising from about 0 to about 30 wt % carbonate.

17. A laundry detergent composition comprising a particle according to claim 14.

18. The particle according to claim 14, wherein the particle is made from an aqueous slurry, wherein the sulphate is added to the slurry, and wherein the sulphate added to the slurry has a volume average particle size of from about 20 micrometers to about 45 micrometers.

* * * * *